May 14, 1957 B. C. CHAPPELL 2,791,864
LAMP CARRIED TRAP FOR MOTHS AND OTHER INSECTS
Filed Jan. 25, 1954
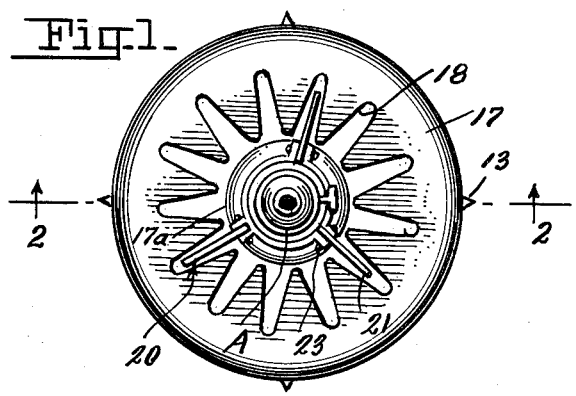
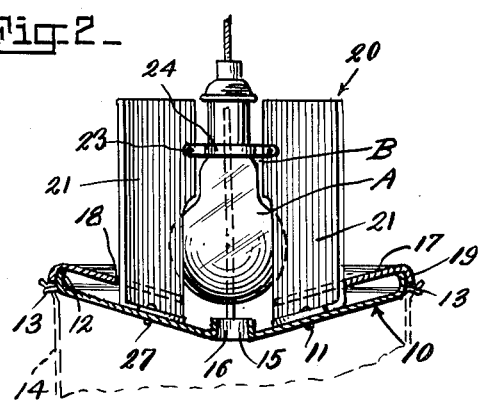
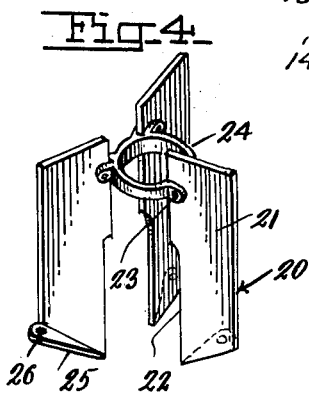
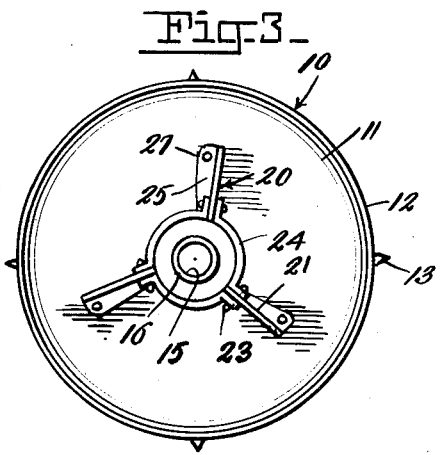
INVENTOR.
BERT C. CHAPPELL
BY
Patrick D Beavers
ATTORNEY

2,791,864

LAMP CARRIED TRAP FOR MOTHS AND OTHER INSECTS

Bert C. Chappell, Pleasant Hill, Mo.

Application January 25, 1954, Serial No. 405,779

1 Claim. (Cl. 43—113)

This invention relates to improvements in devices for trapping and annihilating moths and other insects, particularly those with the ability to fly and which are attracted by light, such as from an incandescent lamp.

The principal object of the present invention is to provide an insect trap and annihilator which can be readily suspended by an incandescent lamp bulb, so that insects attracted by the bulb when energized will be trapped and exterminated as a result of contact with heat from the bulb.

Another important object of the invention is to provide an insect trap and annihilator constructed in such a manner as to not only catch and exterminate insects but to cause automatic expulsion thereof as the trap becomes loaded.

Still another object of the invention is to provide a device of the character stated which is of simple construction and capable of being manufactured and retailed at a low monetary figure.

These and various other objects and advantages of the invention will become apparent to the reader of the following description.

In the drawing:

Figure 1 is a top plan view of the device associated with a lamp bulb.

Figure 2 is a vertical sectional view taken on line 2—2 of Figure 1.

Figure 3 is a top plan view with the bowl lid removed.

Figure 4 is a perspective view of the panel assembly removed from the device.

Referring to the drawing wherein like numerals designate like parts, it can be seen that reference character A denotes an electric light bulb having one or more shoulders B, which will serve to support the present invention which is generally referred to by numeral 10.

The present invention contemplates the provision of a bowl 11, which is shaped to provide an outwardly radiating and slanting bottom provided at its periphery with an upturned lip 12 and at this point, the bowl is struck or otherwise formed to provide outstanding spurs 13 over which the upper edge of a paper bag 14 can be disposed so that it will suspend below the device and particularly below an opening 15 in the central portion of the bowl 11. The portion of bowl 11 surrounding the opening 15 is provided with a short upstanding wall 16 and this wall underlies the lowermost portion of the bulb A.

Numeral 17 denotes a lid for the bowl and this consists of an annulus having a central opening 17a formed therein and radiating outwardly from this opening are slots 18 which terminate inwardly of the peripheral edge of the lid 17, the lid 17 being provided with a downturned peripheral lip 19 to slip over the lip 12 of the bowl 11, as shown in Figure 2.

The slots 18 are sufficiently elongated so that the same can accommodate the panel assembly generally referred to by numeral 20.

The panel assembly consists of a plurality of vertically disposed baffles or panels 21 which may be reduced at portions 22 to accommodate the bulb A and the upper portions of the panels 21 at their inner edges are secured as at 23 to lugs on a ring 24. The small diameter portion of the bulb A can easily slip through the ring 24 before it is disposed into its socket and the ring 24 rests upon a shoulder B of the bulb for supporting the device. The lower edges of the panels 21 are slanted and are provided with laterally disposed flanges 25 formed with openings 26 through which bolts or screws 27 can be disposed for securing the panel assembly to the bowl, so that the panel assembly will project upwardly as shown in Figure 2. Obviously when it is desired to clean out the bowl, the lid 17 need only be spread upwardly to remove it from the device so that access can be had to the bottom of the bowl.

It can now be seen, that moths and other flying bugs will be attracted by the bulb A when the latter is energized and in flying toward the bulb will either strike the bulb or the panels 21, causing the insects to drop and in moving upon the lid 17 will fall through one of the slots 18 onto the bottom of the bowl 11. Moving downwardly toward the opening 15, the insects will be stopped by the short wall 16 where they will be subjected to the intense heat of the bulb and after moving around as much as possible under this condition will die. Subsequent insects will be annihilated in the same manner and will in kicking about after being slowed down by the heat cause displacement of some of the dead insects, to the end that the same will move over or fall over the wall 16 and through the opening 15 into the paper bag or other container 14.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

An insect trap for attachment to an electric lamp bulb having an enlarged lower portion and a relatively smaller upper portion, said trap comprising a bowl having a central aperture, an upstanding wall adjacent said central aperture, a plurality of radially extending vertical fins affixed at their lower ends to said bowl, a ring adapted to encompass the upper portion of said lamp bulb and interconnecting the upper end portions of said fins, and a cover for said bowl having a central opening and a plurality of radially extending slots extending from said opening, said fins extending through certain of said slots and said cover being vertically movable with respect to said bowl.

References Cited in the file of this patent

UNITED STATES PATENTS

| | | |
|---|---|---|
| 473,920 | Edwards | May 3, 1892 |
| 720,990 | Williams | Feb. 17, 1903 |
| 1,482,420 | Wilson | Feb. 5, 1924 |
| 1,564,976 | Sauer | Dec. 8, 1925 |
| 1,713,557 | Sauer | May 21, 1929 |
| 2,198,807 | Eshbaugh | Apr. 30, 1940 |